July 11, 1950     F. B. STULEN     2,514,525
METHOD OF PRODUCING BLADE CONSTRUCTIONS
AND PROPELLER BLADES
Original Filed March 9, 1944     4 Sheets-Sheet 1

Inventor
Foster B. Stulen
Attorney

July 11, 1950

F. B. STULEN 2,514,525

METHOD OF PRODUCING BLADE CONSTRUCTIONS AND PROPELLER BLADES

Original Filed March 9, 1944

Inventor
Foster B. Stulen
Attorney

Inventor
Foster B. Stulen
Attorney

July 11, 1950

F. B. STULEN 2,514,525

METHOD OF PRODUCING BLADE CONSTRUCTIONS AND PROPELLER BLADES

Original Filed March 9, 1944

Inventor
Foster B. Stulen
Attorney

Patented July 11, 1950

2,514,525

UNITED STATES PATENT OFFICE 2,514,525

METHOD OF PRODUCING BLADE CONSTRUCTIONS AND PROPELLER BLADES

Foster B. Stulen, West Orange, N. J., assignor to Curtiss-Wright Corporation, a corporation of Delaware Original application March 9, 1944, Serial No. 525,743. Divided and this application December 23, 1944, Serial No. 569,584

1 Claim. (Cl. 29—156.8)

This invention has reference to the art of producing internally reinforced hollow metal propeller blade constructions and propeller blades.

The invention has reference to a method of producing a metal blade construction which is interiorly reinforced with a rib arrangement and which has its external surfaces disposed substantially symmetrical with respect to a plane extending longitudinally thereof.

The invention has further reference to the method of producing a blade construction as aforesaid, said blade construction including its rib arrangement subsequently having propeller blade pitch and final profile imparted thereto.

An object of the invention is to provide a method of fabricating a blade construction or structure, that is, a partly fabricated blade subject to final finishing operations, which includes the use of different welding processes in different portions of the blade construction. Another object is to use a welding technique in a certain part of the blade construction which is most adaptable to the configuration of the blade material at that point. A further object is to utilize welding techniques which are of production character, as distinguished from manual welding methods which are not so susceptible to precise and uniform control. A further object is to provide a propeller blade manufacturing method wherein high quality blade constructions may be attained and duplicated without the exercise of unusual skill or proficiency on the part of the welding operator.

Various other objects, advantages and features of my invention will become apparent from the following detailed description.

The invention resides in the method of producing blade constructions and propeller blades as hereinafter described and claimed.

This application is a division of application Serial No. 525,743, filed March 9, 1944, abandoned subsequent to the filing of this division thereof.

For an understanding of the invention and for an illustration of one of the forms thereof, reference is to be had to the accompanying drawings in which.

Figure 7:
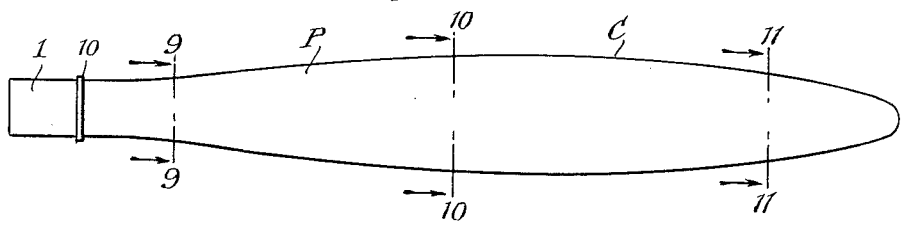
Fig. 7 is a plan view showing a blade constructed in accordance with the invention.
Figure 9:
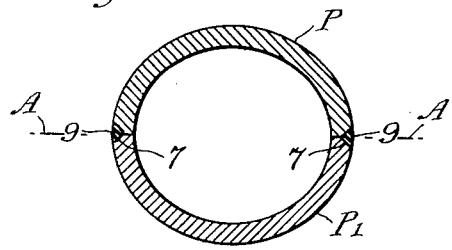
Figure 10:
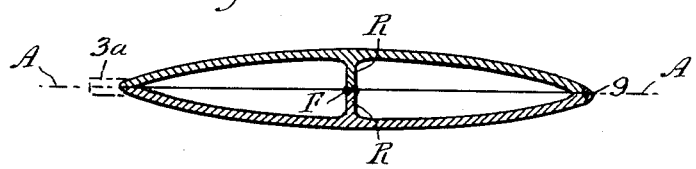
Figure 11:
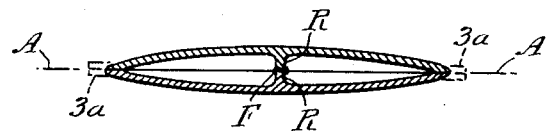
Figure 12:
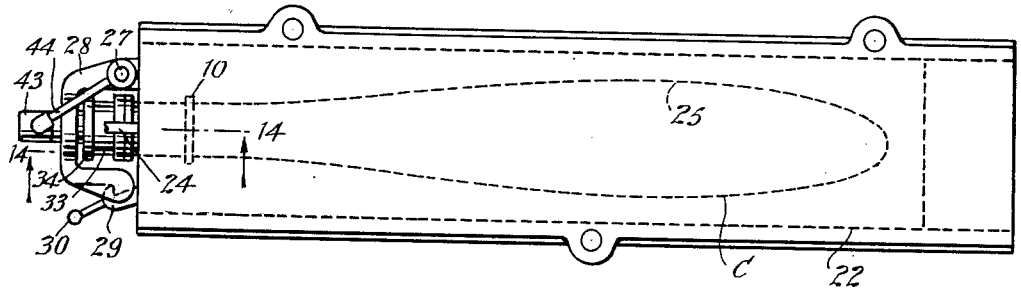
Figure 13:
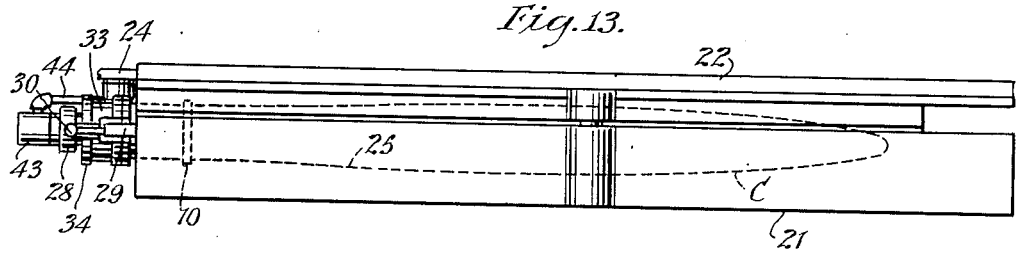
Figure 14:
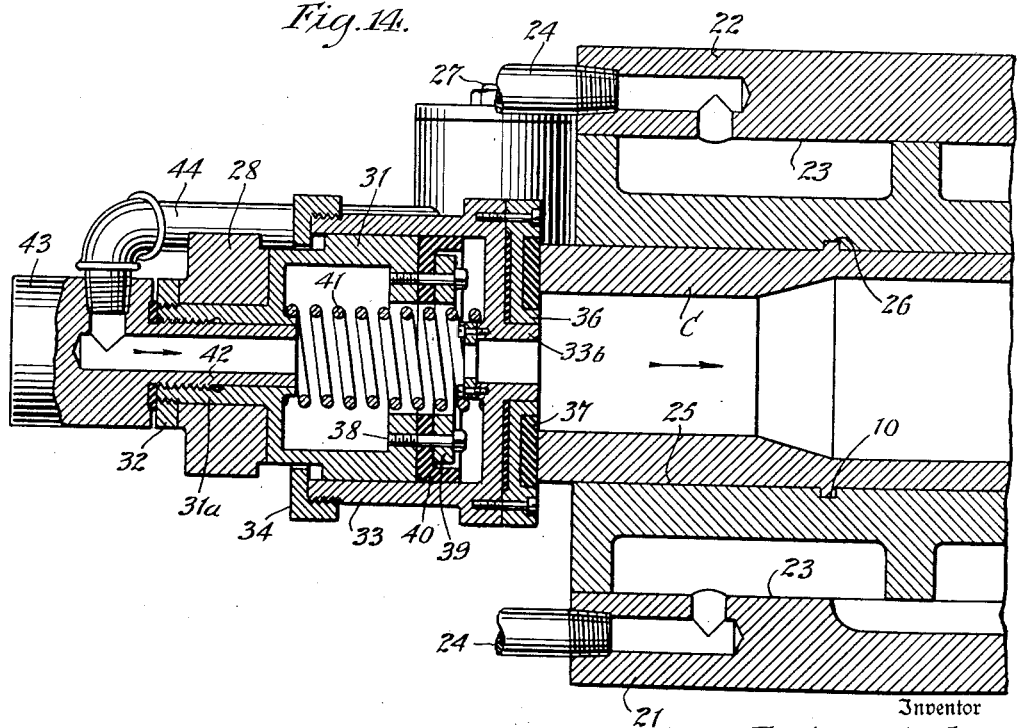
Figure 15:
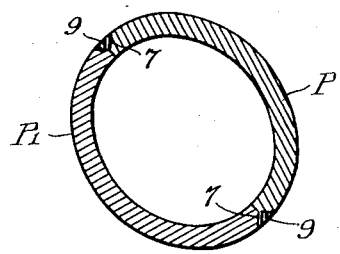
Figure 16:
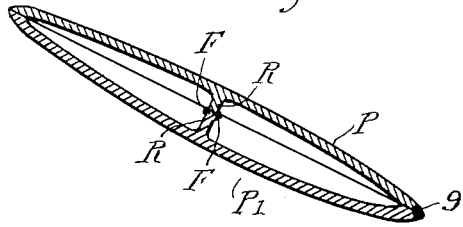
Figure 17:
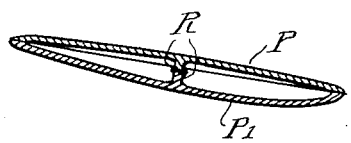
Figure 18:
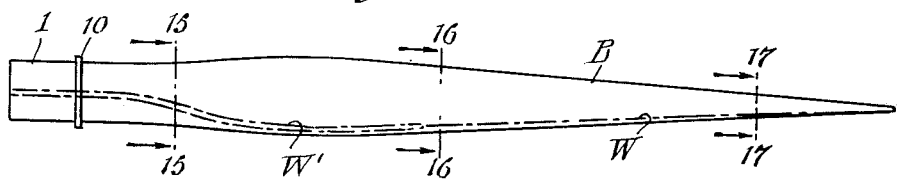

Figs. 9, 10 and 11 are transverse sectional views taken on the respective lines 9—9, 10—10 and 11—11 of Fig. 7 looking in the direction of the arrows;

Figs. 12 and 13 are plan and elevational views respectively showing a die arrangement for imparting twist or pitch angle to a propeller blade construction;

Fig. 14 is an enlarged, longitudinal sectional view taken on the line 14—14 of Fig. 12 looking in the direction of the arrows;

Figs. 15, 16 and 17 are transverse sectional views taken on the respective lines 15—15, 16—16 and 17—17 of Fig. 18, looking in the direction of the arrows; and Fig. 18 is an elevational edge view showing the complete propeller blade constructed in accordance with the invention.

Referring to Figs. 1, 3, 4 and 5, a plate or plate member P is illustrated which is formed preferably from metal and which is free from twist or without twist. The plate P comprises a semi-cylindrical shank 1 merging into the plate proper indicated at 2 which generally, is of convex configuration and substantially symmetrical with respect to the longitudinal center line of the plate member P, the convexity decreasing in a progressive manner as the tip of the said plate is approached. As illustrated, the plate P is tapered in a direction extending toward the tip thereof and it has minimum thickness midway between its edges along the said center line, the thickness gradually increasing toward the respective edges of said plate member.

Figure 1:
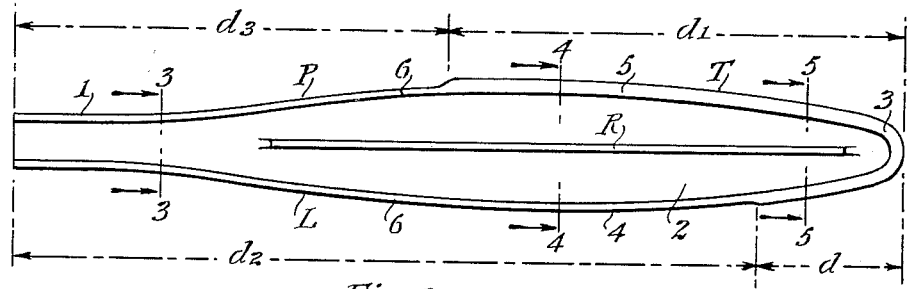
Figs. 1 and 2 are plan views of the complementary plate members each having a longitudinally extending, integral reinforcing rib intermediate the marginal edges thereof.

At its tip, the plate member P terminates in a peripheral flange 3 which extends a distance d from said plate tip along the leading edge 4 of the said plate member P, the flange 3 extending a distance d1 from said plate tip along the trailing edge 5 thereof, Fig. 1, the distance d1 being substantially greater than the distance d. The flange 3 is of uniform configuration and, by reason of the fact that the plate member P is free from twist (pitch angle formation), it occupies a single plane throughout the length thereof.

The plate member P terminates in a flat surface 6 starting at the end of the flange 3 on the plate leading edge 4, extending throughout the remainder of said leading edge and continuing throughout the length of the adjacent side of the shank 1, the length of said flat surface being indicated by the distance d2. Another flat surface 6 starts at the end of the flange 3 on the plate trailing edge 5, extends throughout the remainder of said trailing edge and continues throughout the length of the adjacent side of the shank 1, the length of said last named flat surface being indicated by the distance d3.

By reason of the fact that the plate member P is free from twist, as noted above, the aforesaid flat surfaces 6 lie substantially in a single plane which coincides, more or less, with the upper surface of the flange 3. Further, the said flat surfaces 6 terminate in the respective chamfered surfaces 7 which extend downwardly therefrom in inclined relation as viewed in Figs. 3 and 4.

Figure 2:
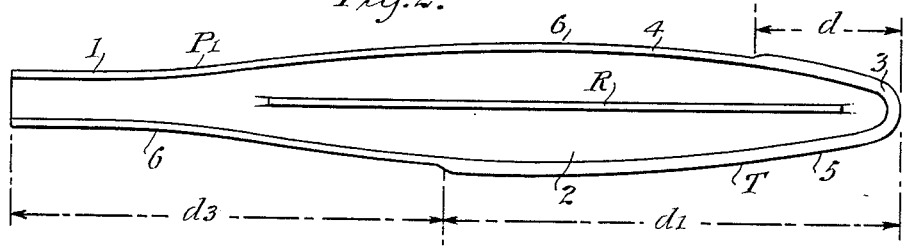
Figure 3:
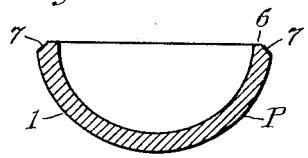
Fig. 3 is a transverse sectional view taken on the line 3—3 of Fig. 1.
Figure 4:
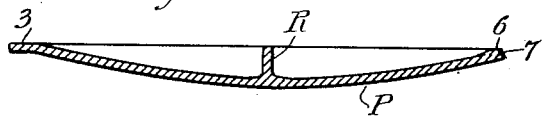
Fig. 4 is a similar view taken on the line 4—4 of Fig. 1.
Figure 5:
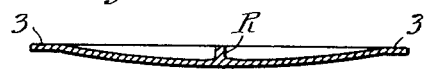
Fig. 5 is a transverse sectional view taken on the line 5—5 of Fig. 1.

In Fig. 2, there is shown a plate or plate member P1 which is a duplicate, or substantially so, of the plate member P with the exception that it is of opposite hand. The peripheral flanges 3 and the edge surfaces 6 and 7, as above described, are provided for the purpose of effecting two different welds between the plate members P and P1. By reason of the fact that the plate members P and P1 taper progressively from the shank forming end 1 to the blade tip forming end where the respective plates are relatively thin, a weld juncture satisfactory in the shank end half of the blade construction would not be satisfactory in the tip end half thereof because of the insufficient amount of metal available for a fused metal weld of substantial penetration. Consequently, the respective plate members P and P1 are each provided with a flange 3 as described and illustrated in Figs. 1 and 2, whereby a greater weld area adapted for substantial penetration is produced and a weld effected in seam fashion with the result that an intimate metallurgical union between the relatively thin plate areas is effected to a degree similar to that obtained in the relatively thick areas of the aforesaid plate members.

In accordance with the present invention, the plate members P and P1 are each provided with a longitudinally extending, complementary reinforcing member or rib R which is, preferably although not necessarily, hot forge rolled in a known manner, to a desired height and thickness as an integral part thereof, prior to the initial formation of each plate member P and P1, as will be understood. Alternatively, suitable reinforcing members or ribs R may be separately attached to the respective plate members as by welding or otherwise and said members thereafter hot or cold pressed to impart a substantially convex configuration thereto, the said plate member being subsequently individually trimmed to the shape illustrated in Figs. 1, 2 and 3.

The carrying out of this invention is predicated on the use of several different welding methods or techniques, each one being applied to portions of the blade components where it is best adapted to produce an optimum result, in accordance with the configuration of the metal of the component in the zone of the joint to be achieved. Heretofore, a single welding or securing technique has usually been used throughout a blade, the technique or the blade component being modified to attain the weld even through the weld or structure may not be optimum. In this invention, as hereinafter more fully described, flash welding, resistance stitch or "seam" welding and submerged melt arc or other adaptable butt welding techniques are used for different portions of the blade structure.

Flash welding, as is known and as is herein contemplated, consists in electrically charging parts to be welded or connecting the parts to an electric power source, touching the parts to draw an arc which develops across the entire surface to be joined whereby the parts are heated to a plastic or molten temperature and then controllably jamming the pieces against one another to intermingle the plastic or molten metal to effect a weld.

Resistance stitch or seam welding as is known and as herein contemplated, consists in passing two preferably thin flat pieces in assembled relation, between electrodes which are repeatedly or continuously pressed against opposite sides of the plates more or less concurrently with the passage of electrical current pulses of short dwell and high density, the electric current heating the contacting portions of the plates adjacent the electrodes whereby the plates are fused together in a succession of overlapping spots, the electrode pressure serving to enforce intermingling of the electrically heated molten or plastic metal of the pieces.

Fusion welding and other sorts of submerged arc, arc, or torch welding as are known and as are herein contemplated, consists in heating two adjacent pieces to be welded by a flame or electric arc concurrently with the inlaying or addition of molten weld metal, whereby the two pieces are fused to one another.

With each of the plate members so completed and in accordance with the invention, the plate members P and P1 are disposed in facing relation and at the same time suitably held relative to each other whereby to effect a flash welded juncture F between the abutting faces of the reinforcing ribs.

Figure 6:
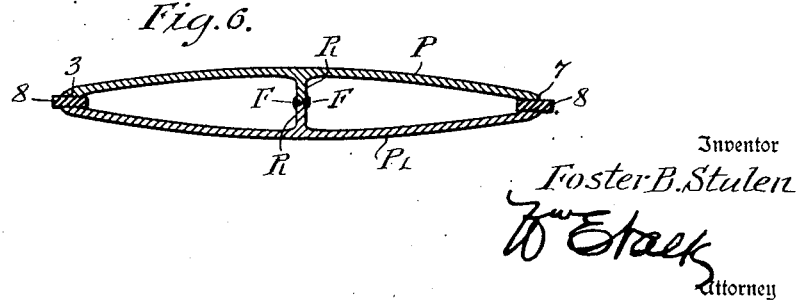
Fig. 6 is a cross-sectional view showing the complementary plate members as joined by a flash weld intermediate the leading and trailing edges thereof and with said edges held separated by insulating members.

In the flash welding operation and more particularly in the flash welding of the aforesaid reinforcing ribs R, preferably constituting an integral part of the aforesaid blade forming plate members P and P1, the leading and trailing edge forming portions 4 and 5 thereof are separated and also insulated from each other by means of blocks or strips 8 of suitable insulating material, as clearly shown in Fig. 6, whereby to prevent passage of electrical energy between the said leading and trailing edge portions of said plate members.

In the flash welding art, it is known that elements to be joined by a flash weld, must first be brought into contacting engagement and subsequently more or less separated to establish an arc therebetween whereby to burn off uneven points or edges along the surfaces to be joined, to some extent at least and then maintain said elements separated with the arc therebetween until the metal has become plastic. When the metal has been sufficiently heated to become plastic in the immediate regions to be joined, the elements are brought together quickly under pressure which results in the weld F therebetween being effected.

Thus, initially, the plate member reinforcing ribs R may be of a height which is substantially above the level of the respective faces of the aforesaid flanges 3 and surfaces 6. Accordingly, when the aforesaid plate members P and P1 have been positioned in spaced parallel facing relation preparatory to flash welding the aforesaid plate reinforcing ribs R, the facing surfaces of the said ribs are not parallel but taper more or less from the "inboard" or shank region end of said ribs to the rib ends adjacent the blade tip end of said plate members P and P1. Accordingly, when the said plate members P and P1 are moved toward each other, as in a flash welding operation, the reinforcing ribs R may contact each other initially at their shank region ends or at any other predetermined point along the length of said ribs, whereupon the said contacting end portions are separated to establish an arc therebetween, said arc thereafter progressively traversing the entire length of the said reinforcing ribs. As the aforesaid arc transverses the length of said ribs R, the excess metal presented by the said ribs at their shank region end melts, burns or sputters away progressively toward the opposite or "outboard" end of said ribs R until the opposing rib surfaces become parallel. At this time, the said opposing rib surfaces have become sufficiently plastic to a suitable degree of penetration or depth whereupon the aforesaid plate members are quickly moved toward each other under pressure to upset or force the plasticized facing rib surfaces together to effect the flash weld F as will be understood.

The subsequent withdrawal of the previously inserted insulation material 8 between the respective flanges 3 and surfaces 6 of the plate members as aforesaid, presents no problem since after the welding of the ribs, the leading and trailing edge portions 4 and 5 of the respective plate members P and P1 will spring together whereby the aforesaid flange 3 and surface 6 of each plate member will assume a position of contacting engagement.

After the aforesaid plate members P and P1 have been initially joined by a flash weld as hereinafter described, the resulting flash or upset extrusion is removed and this may be done in the following manner which is cited merely as one example since other mechanical or chemical methods may be employed. In the removal of the flash, above mentioned, the centrally joined plate members are secured to a suitable support either in a vertical or horizontal position. When so secured and with the leading and trailing edges held separated, a suitable mandrel-like member having its free end provided with suitable cutter, shear, grinding, abrading or other metal working arrangement, may be inserted between said edges and into contact with said flash and then drawn along one side of the rib juncture. Alternatively, two mandrel-like members may be utilized to clean both sides of the rib juncture F simultaneously as will be understood. Thus, as said mandrels are drawn relative to said joined plate member, the flash or upset extrusion may be readily, completely removed in one or more operations as necessary.

Ordinarily, flash welding may be accomplished with a 60-cycle alternating current. In such cases, however, the completed weld exhibits an undesirable amount of upset extrusion at the sides of the weld F which should and ordinarily is removed in the fabrication of articles such as a hollow propeller blade.

It is known that in the use of a high frequency alternating current for carrying out a flash welding operation as herein described, energy penetration is reduced to a practical minimum because of a high temperature gradient obtainable in the immediate vicinity of the surface regions to be welded. Thus, the localized heating of said surface regions results in a material reduction in the amount of hot metal spatter and subsequent upset extrusion. This method of flash welding is highly desirable and preferably, although not necessarily, used in joining selected portions of the blade forming plate members P and P1, in accordance with the present invention since a minimum amount of upset extrusion or flash at the sides of a weld juncture F so made, is more readily removed.

With the plate members P and P1 thus disposed in joined facing relation, the respective inter-faces of the flanges 3 engage each other in parallel relation adapted for effecting a seam weld throughout their respective lengths and the respective surfaces 6 in substantially abutting relation adapted for a submerged arc weld. Further, throughout the lengths of the respective sets of engaging surfaces 6, the aforesaid surfaces 7 are angularly related to each other to thereby form channels utilizable as hereinafter described. Accordingly, the aforesaid flanges 3 are now subjected to a "stitch" resistance welding operation wherein the inter-faces are fused together by a substantial amount of weld penetration, and the engaging surfaces 6, together with the angularly related surfaces 7, subjected to a submerged metallic arc welding operation, the latter causing layers of weld metal 9 to be deposited in the respective channels. In this manner, the plate members P and P1 are welded together to thereby produce a partially completed propeller blade construction indicated at C.

Figure 8:
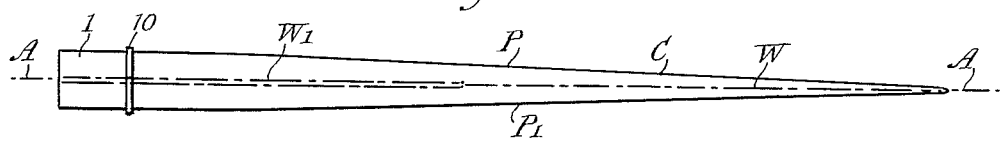
Fig. 8 is an edge view of the same.

Thereafter, the blade construction is brought more nearly to its complete state by grinding away or otherwise removing the extensions 3a of the flanges 3, welding or upsetting a cuff ring 10 on the shank 1 of the blade construction C and subjecting said shank as then existing to an upsetting operation as known in the art to thereby produce the blade construction shown in Figs. 7 and 8. The welded joint produced by the aforesaid resistance welding operation is indicated at W in Fig. 8 whereas the welded joint produced by the aforesaid metallic arc welding operation is indicated at W1. These welded joints are shown as disposed substantially in plane relation as indicated by the plane A, Fig. 8, and this is indicative of the plane relation taken by the sets of engaging flanges 3 and surfaces 6 prior to the welding operation.

In view of the foregoing description, it will be understood that the blade construction of Figs. 7–11 inclusive has its external surfaces disposed symmetrically, or substantially so, with respect to a plane extending longitudinally of said blade construction. In the disclosed form of the invention, this plane is the aforesaid plane A. The blade construction is symmetrical by reason of the fact that any line extending perpendicular to the plane A and intersecting one side of said blade construction has the same length, between the plane A and the point of intersection, as the length of a straight-line extension of said line between said plane A and the point of intersection thereof with the opposite side of said blade construction.

An important feature of the invention resides in the fact that the reinforcing ribs R and the engaging surfaces 3 and 6 of the plate members P and P1 lie in a single plane, or substantially so, as referred to immediately above. Therefore, the described welding operations, which are of the "machine" or automatic type, may readily be performed in minimum time and with minimum labor.

As at present preferred, the plates P and P1, forming the blade construction C, are welded together by dissimilar welding operations in the manner described. However, it shall be understood that the invention is not to be thus limited since the aforesaid plate members may be welded entirely together by an operation of one kind. It shall also be understood that the welding operation in which the aforesaid plate members are joined together, may if desired, be of the manual rather than the "machine" type.

After having been brought to the condition illustrated in Figs. 7 and 8, the blade construction C, which at this time is free from twist, is subjected to a twist imparting operation.

Twist and final blade form is imparted to the blade construction in a manner known in the art, as for instance by the methods and apparatus shown and described in Patent No. 2,350,541. Briefly, this procedure consists in heating forming dies, heating the blade construction, embracing the blade construction in the dies, and applying air or gas under high pressure to the blade interior through the blade shank as by a breech mechanism such as that shown in Fig. 14. The blade surfaces are thus forced into intimate contact with the surfaces of the die cavity. Temperature of the dies and cooling after forming is regulated by cooling water in jackets in the dies. After this operation is completed, gas or air pressure is cut off, the breech mechanism is removed from the blade, the dies are parted and the shaped blade B as shown in Fig. 18 is removed from the die assembly.

As hereinbefore stated, the blade construction C is initially free from pitch angle or twist. The operation referred to immediately above, during closing of the dies and during application of internal pressure to the blade construction imparts the desired twist or pitch angle thereto and causes the welded joints W, W1 to take the position illustrated in Fig. 18 for example. In the aforesaid operation, the joined ribs R present a single plate member reinforcing rib which has assumed a more or less spiral formation as a result of the twist imparted to the joined plate members comprising the aforesaid blade construction C. However, the extent of the twist thus imparted to the said joined ribs R is such that no substantial deviation from the vertical is apparent when viewed longitudinally of the said blade construction at any station or section along the length thereof as exemplified in Figs. 16 and 17. At the same time, the described operation removes minor irregularities such as depressions from the blade surfaces.

It will be understood, as known in the art, that the herein described press may be of such character that a coolant such as water, for example, is caused to directly engage the pre-heated blade surfaces.

While the weld juncture effected between the plate member reinforcing ribs R, as herein described, is preferably carried out by means of a flash welding operation, it is to be expressly understood that the aforesaid rib weld F, may be effected by means of a submerged metallic arc weld, atomic-hydrogen weld, spelter brazed or, a separate rib connecting or bridging member welded between the said ribs R by brazing or by a welding process other than a flash weld.

Such alternate welding operations may be readily performed by bending or otherwise temporarily deforming the leading and trailing edge portions of each of the aforesaid plate members whereby, when the ribs R are brought together, as in a welding operation, suitable apparatus for performing a weld operation other than a flash weld, may be inserted between the said plate members and into close proximity with the said reinforcing ribs R, as will be understood.

While the invention has been described with respect to a certain particular preferred example which gives satisfactory results, it will be understood by those skilled in the art after understanding the invention, that various changes and modifications may be made without departing from the spirit and scope of the invention and it is intended therefor, in the appended claim to cover all such changes and modifications.

What is claimed as new and desired to be secured by Letters Patent is:

In the art of producing a propeller blade, the steps of forming a pair of relatively convex rib bearing plates having semi-cylindrical end portions whose edges when the plates are superposed lie in abutting relation, forming on each plate edge portions intermediate the plate length which when the plates are superposed lie in abutting relation, forming on each plate extended tip edge flange portions which when the plates are superposed lie in parallel contacting relation with said ribs lying in edge-abutting relation, all said edges lying in plane relation, and the further steps which consist in superposing said formed plates, uniting said rib edges by an electric flash weld while holding the other edge portions in spaced relation, bringing said other edge portions into contacting relation, uniting said extended tip edge flange portions by an electric resistance seam weld between said flanges, uniting the remaining curved edge portions by an inlaid fusion butt weld to form a wholly united blade structure, trimming said structure to blade form, and finally forming said structure to blade configuration.

FOSTER B. STULEN.

REFERENCES CITED

The following references are of record in the file of this patent:

UNITED STATES PATENTS

| Number | Name | Date |
|---|---|---|
| 928,701 | Rietzel | July 20, 1909 |
| 1,461,866 | Dornier | July 17, 1923 |
| 1,806,539 | Cram | May 19, 1931 |
| 1,937,966 | Junkers | Dec. 5, 1933 |
| 2,007,775 | Smith | July 9, 1935 |
| 2,210,277 | Bullock | Aug. 6, 1940 |
| 2,214,339 | McKee | Sept. 10, 1940 |
| 2,235,032 | McKee | June 5, 1937 |
| 2,427,785 | Hoover | Sept. 23, 1947 |
| 2,457,202 | Brady | Dec. 28, 1948 |

FOREIGN PATENTS

| Number | Country | Date |
|---|---|---|
| 417,232 | Great Britain | Oct. 7, 1934 |

OTHER REFERENCES

Weld. Encyclo. (11th ed.) 1943, pub. by Weld. Eng. Pub. Co., pp. 565-567.